(No Model.) 4 Sheets—Sheet 1.
J. KOHLER & G. WITTMANN.
MACHINE FOR TRIMMING AND CUTTING UP BEANS.
No. 464,880. Patented Dec. 8, 1891.
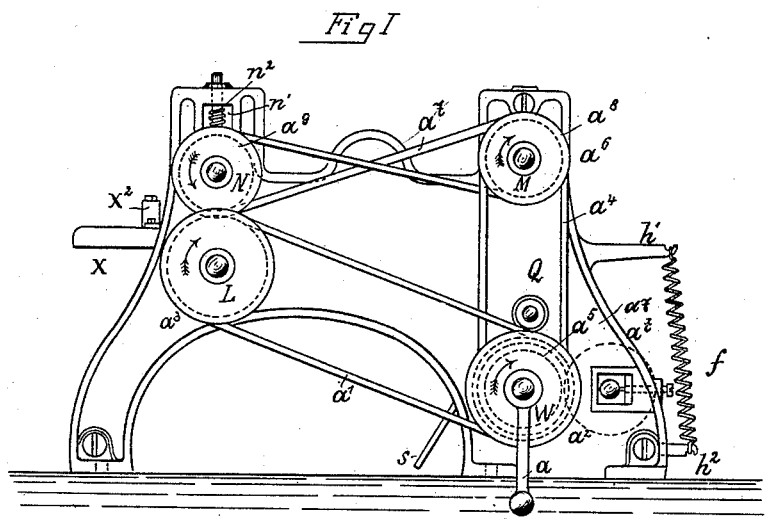
Fig. I
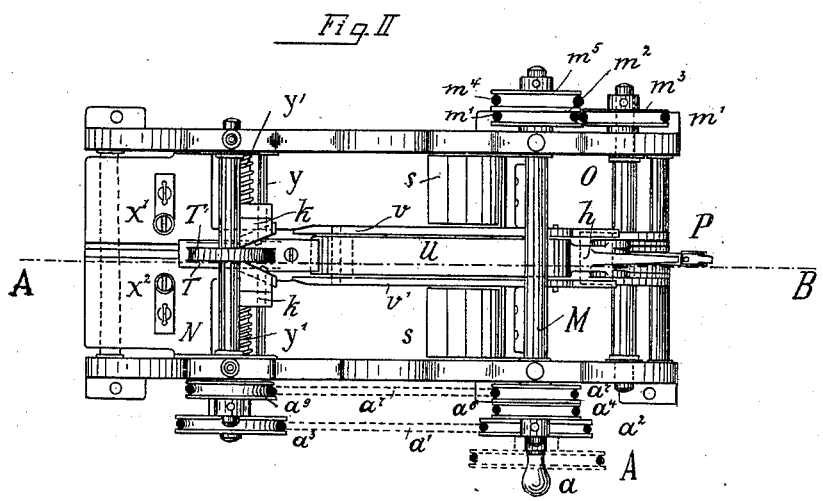
Fig. II
Witnesses:
George E. Cruse
Harry S Rohrer
Inventors:
Josef Kohler
Georg Wittmann
By Knight Bros
Attorneys.

(No Model.) 4 Sheets—Sheet 2.
J. KOHLER & G. WITTMANN.
MACHINE FOR TRIMMING AND CUTTING UP BEANS.
No. 464,880. Patented Dec. 8, 1891.
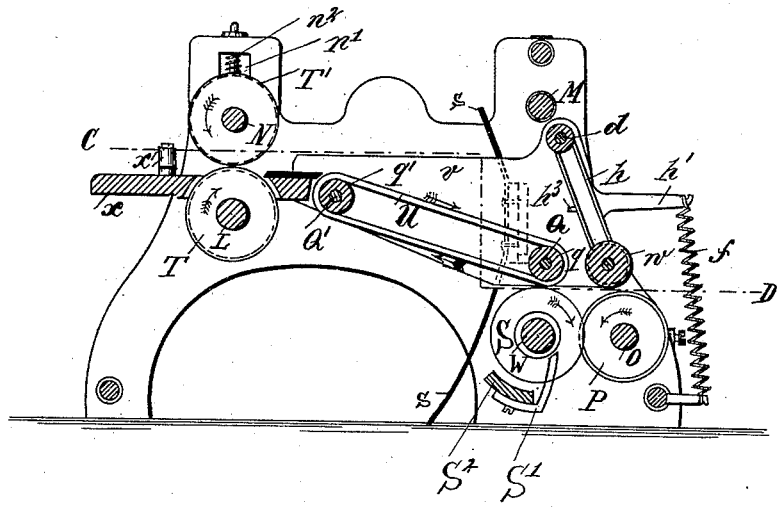
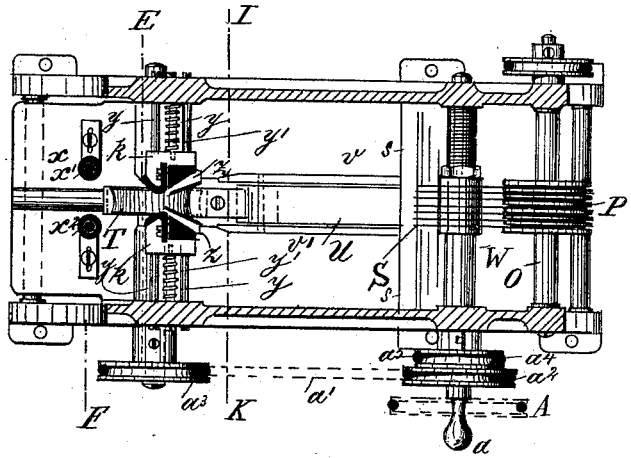
Witnesses:
George E. Crane
Harry S. Rohrer
Inventors:
Josef Kohler,
Georg Wittmann
By Knight Bros.
Attorneys.

(No Model.) 4 Sheets—Sheet 3.
J. KOHLER & G. WITTMANN.
MACHINE FOR TRIMMING AND CUTTING UP BEANS.
No. 464,880. Patented Dec. 8, 1891.
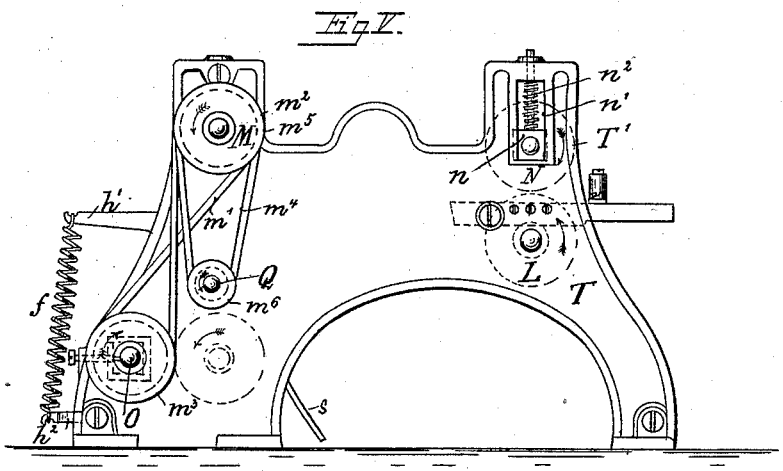
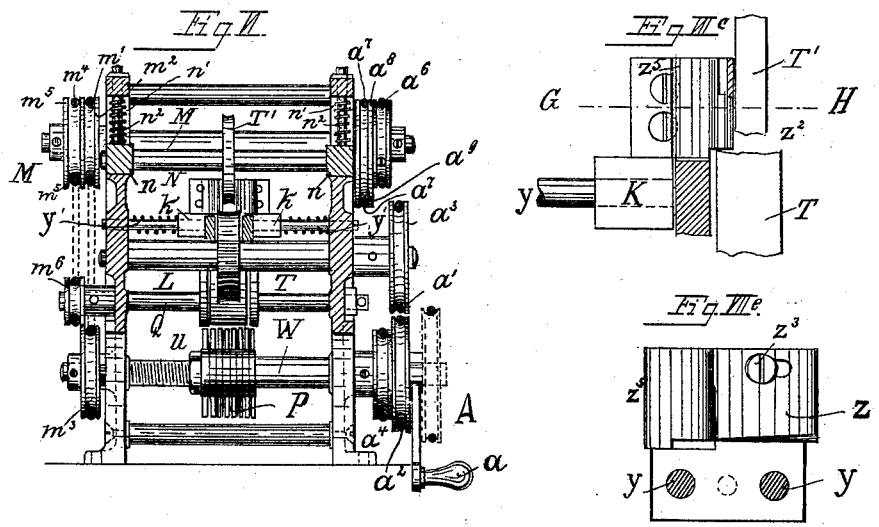
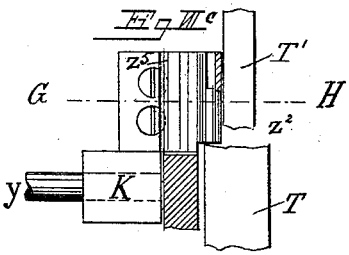
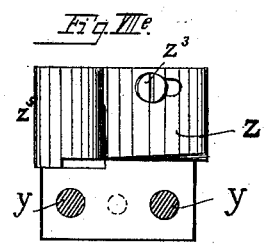
Witnesses
George E. Cruse
Harry S. Rohner
Inventors:
Josef Kohler
Georg Wittmann
By Knight Bros.
Attorneys (No Model.) 4 Sheets—Sheet 4.
J. KOHLER & G. WITTMANN.
MACHINE FOR TRIMMING AND CUTTING UP BEANS.
No. 464,880. Patented Dec. 8, 1891.
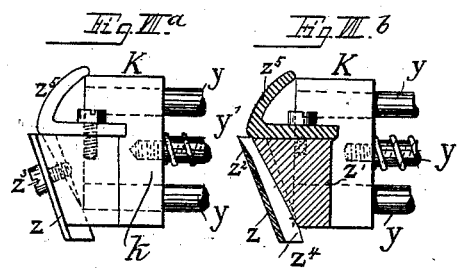
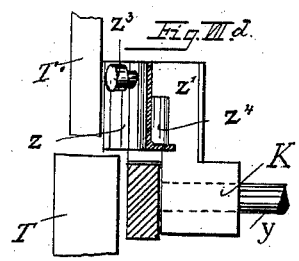
Witnesses:
George E. Cruu.
Harry B Rohrer
Inventors:
Josef Kohler
Georg Wittmann
By Knight Bros.
Attorneys.

UNITED STATES PATENT OFFICE.

JOSEF KOHLER, OF MANNHEIM, AND GEORG WITTMANN, OF SCHWETZINGEN, GERMANY.

MACHINE FOR TRIMMING AND CUTTING UP BEANS.

SPECIFICATION forming part of Letters Patent No. 464,880, dated December 8, 1891.

Application filed July 7, 1891. Serial No. 398,704. (No model.)

*To all whom it may concern:*

Be it known that we, JOSEF KOHLER, of Mannheim, and GEORG WITTMANN, of Schwetzingen, in the Grand Duchy of Baden, and German Empire, have invented a new and useful Machine for Trimming and Cutting up Beans, of which the following is a specification, reference being had therein to the accompanying drawings.

This machine for trimming and cutting up beans (constructed according to this invention) has for its object to pull off the strings or filaments from the two sides of a bean and then to convey the pods by means of a traveling band to a bean-cutting device, upon which the beans freed from their strings are cut up in several parts, and thus prepared for preserving, cooking, or other purposes. This machine operates in such a manner that the beans are laid flat upon a feeding-table and subsequently seized by a pair of rimmed conveyer-disks, which brings them to the heads of the trimming or pulling-off knives. These knives are placed at an angle to the advancing bean cut in the grain between the two parts of the pod, and thereby extract the strings, which are found on both sides of beans, as the latter move forward. These strings are led away on both sides by the knives, while the beans freed therefrom are moved farther by a traveling band and thrown against an oscillating roller having resilient bearings, and which feeds the latter in suitable lengths to the circular knives. The machine is actuated by a crank-handle or by any suitable means or power.

The invention is fully illustrated in the accompanying drawings, in which—

Figure I is a front view, and Fig. II a plan, of the machine. Fig. III is a longitudinal section of the machine on line A B of Fig. II. Fig. IV is a horizontal section of the machine on line C D of Fig. III. Fig. V is a rear view of the machine. Fig. VI is a vertical view on line E F of Fig. IV. Figs. VII$^a$, VII$^b$, VII$^c$, VII$^d$, VII$^e$ are detail views of the two knives used to extract the strings, Fig. VII$^a$ showing a knife from above, Fig. VII$^b$ a horizontal section of a knife on line G H of Fig. VII$^c$, Fig. VII$^c$ a view of a knife from the entrance side of the beans, and Fig. VII$^d$ a view of a knife from behind and Fig. VII$^e$ a side view of the knife as it appears when seen in the direction of line A B of Fig. II.

The bean trimming and cutting machine is constructed as follows: The shaft W, set in motion by the crank-handle $a$ or other mechanism, such as a pulley A, and upon which the knives S, Figs. III and IV are fixed, drives the shaft L by means of belts or cords $a'$ and of the disks $a^2$ and $a^3$, and the shaft M by means of belts or cords $a^4$ and of the disks $a^5$ and $a^6$. Upon the shaft L is mounted the conveyer-disk T, which turns in the direction of the arrow and is ribbed on its periphery so as to better seize hold of the beans. Over this conveyer-disk is arranged another disk T′, likewise ribbed and keyed on the shaft N. This shaft N is rotated in the direction of the arrow by the aid of cord or belt $a^7$ and of the disks $a^8$ and $a^9$, so that both conveyer-disks have a tendency to seize hold of the beans laid on the table $x$. The shaft M transmits further a rotary motion to the axis O at the rear of the machine by means of the cord or belt $m'$ and of the disks $m^2$ $m^3$, the axis O carrying the drawing-rollers P, which are used to bring the beans against the circular knife S. The shaft M imparts also a motion to the shaft Q by means of the cord or belt $m^4$ and of the disks $m^5$ $m^6$. The shaft Q carries a roller $q$ and an axis Q′, arranged behind the conveyer-disks and carrying a roller $q'$, Fig. III. On the two rollers $q$ $q'$ is arranged the traveling band U, which is driven in the direction of the arrow and has for its object to convey the beans from the trimming to the cutting knives. The heads $k$ $k$ of the trimming-knives, which are arranged behind the conveyer-disks T T′, (the latter of which serves to feed the beans,) are symmetric and slide upon guiding-pins $y$, Fig. VII$^a$, being pressed against the small sides of the beans by the spiral springs $y'$. The heads $k$ $k$ of the trimming-knives are furnished with blocks $z'$, to which are fixed by means of screws $z^3$ the hollow knives $z$, furnished with a sharp point $z^2$. The hollowing of the knife forms a channel which removes the strings drawn thereby from the beans and expels them at the side of the machine. A protecting-plate s, (see Figs. I, II, III, IV, and V,) arranged in front of the knives, prevents the strings separated from being pressed into the knives. The trimming-knives carry a semicircular adjustable guide $z^5$ at their front ends, which is turned toward the beans as they are being introduced, this guide being placed against the beans and regulating the distance between the knives in accordance with the width of the bean. To insure that the conveyer-disk may always seize hold of the beans notwithstanding their different thicknesses, the bearing $n$ of the shaft N of the upper conveyer-disk is guided within forks $n'$ and are pressed downward by springs $n^2$ against the beans. The beans which have been operated upon by the trimming-knives are fed forward on the traveling band, and the former are prevented from falling by the walls $v\ v'$, arranged above the said band. Before the beans reach the cutting-knives they abut against a roller $w$, which imparts thereto the proper downward direction to cause them to drop into the cutting-knife mechanism. The roller $w$ can turn upon the lever $h$, which oscillates on the pin $d$, and is suspended to the side walls $v\ v'$. To oppose a suitable resistance to the beans abutting against the roller $w$, a spiral spring is arranged upon the arm $h'$ of the lever $h$ and is held by the frame at $h^2$, so as to cause the lever $h$ to abut against the stop $h^3$. $S'$ is a scraper fixed to the part $S^2$ of the frame and designed to clean the circular knife S. The beans placed on the table $x$ and passing through the two rollers $x'$ and $x^2$ are seized by the conveyer-disks T T' and immediately freed from their strings by the knives $z\ z$, these strings issuing laterally from these knives through the channel $z^4$. The beans are now further conveyed by the traveling-band and guided by the roller $w$ toward the knives S. The drawing-roller P, which gears between the knife-disks S, causes the beans to be acted upon by the knife and cut up into pieces. Should it only be required to extract the strings from the beans and not to cut them, the spiral spring $f$ would be disconnected and the lever $h$ pulled back with the roller $w$, so that the beans delivered by the traveling band U would be directly removed from the machine without reaching the knives.

What we claim, and desire to secure by Letters Patent of the United States, is—

1. The combination of the conveyer-disks, the spring-heads, the trimming-knives mounted on the spring-heads, and the table for feeding the beans to the conveyer-disks, which in turn present the beans to the trimming-knives, substantially as described.

2. The combination of the feeding-table, the conveyer-disks, the spring-heads, the trimming-knives mounted on the spring-heads, and the traveling band, substantially as described.

3. The combination of the conveyer-disks, the spring-heads, the trimming-knives mounted on the spring-heads, the traveling band, and the circular knives, substantially as described.

4. The combination of the conveyer-disks, the heads having trimming-knives, the traveling band, the cutting-knives, the spring-roller, and the drawing-roller, substantially as described.

5. The combination of the guiding-rods, the heads mounted upon the guiding-rods, and the trimming-knives mounted upon the heads, having channels and circular guides somewhat drawn back near the cutting-edges of the trimming-knives for the purpose of determining the cutting depth of the latter, substantially as described.

In witness whereof we have hereunto set our hands in presence of two witnesses.

JOSEF KOHLER.
GEORG WITTMANN.

Witnesses:
HERMANN MÜLLER,
R. H. GROPP.